United States Patent [19]
Morgan

[11] 3,968,972
[45] July 13, 1976

[54] SELF CENTERING HUB FOR FLEXIBLE RECORDING DISCS AND THE LIKE

[75] Inventor: Samuel A. Morgan, Ann Arbor, Mich.

[73] Assignee: Sycor, Inc., Ann Arbor, Mich.

[22] Filed: June 21, 1974

[21] Appl. No.: 481,523

[52] U.S. Cl. .......................... 279/2 R; 274/40; 279/1 L; 279/1 SJ; 346/137
[51] Int. Cl.² ........................................ B23B 31/18
[58] Field of Search .............. 279/2, 1 W, 1 L, 1 Q, 279/1 SJ; 82/44; 51/330; 360/86, 99, 97; 274/40; 346/137

[56] References Cited
UNITED STATES PATENTS

| | | | |
|---|---|---|---|
| 2,113,141 | 4/1938 | Huenlich et al. | 274/40 |
| 2,739,818 | 3/1956 | Benjamin et al. | 279/2 |
| 3,416,154 | 12/1968 | Heller et al. | 346/137 |
| 3,610,643 | 10/1971 | Thompson | 279/2 X |
| 3,678,481 | 7/1972 | Dalziel et al. | 340/174.1 C |
| 3,729,720 | 4/1973 | Darling et al. | 346/137 |
| 3,768,815 | 10/1973 | Mathurin | 279/40 |
| 3,838,460 | 9/1974 | Stewart | 346/137 X |

*Primary Examiner*—Othell M. Simpson
*Assistant Examiner*—W. R. Briggs
*Attorney, Agent, or Firm*—Price, Heneveld, Huizenga & Cooper

[57] ABSTRACT

A diametrically-enlargeable cylindrical drum portion, preferably comprised of a plurality of movable segmental elements, each of U-shaped or other configuration having a pair of spaced legs or sides, which are resiliently flexible toward one another, mounted in a circuitous pattern on a rotatable member to form outwardly-projecting inner and outer generally concentric annular shoulder formations. The outer such formation provides a segmented hub for receiving a disc by its center opening, such hub being expandable against the opening in the disc to center the latter, as a result of moving a tapered actuator against the inner such annular formation, such actuator preferably comprising a conically angled ridge formation on a rotatable element which is movable into registering contact with the first such member.

31 Claims, 6 Drawing Figures

SELF CENTERING HUB FOR FLEXIBLE RECORDING DISCS AND THE LIKE

BACKGROUND OF THE INVENTION

This invention relates broadly to hub constructions which mount and automatically center discs and the like for driving rotation, and more particularly to self-centering hubs for use with thin, pliant or flexible discs, particularly the rather fragile such discs which carry magnetic recording media on their surfaces and are used as magnetic records, especially in the recording of bit-form digital data.

Data recording apparatus using pliant or flexible magnetic recording discs have come into increasingly frequent use in relatively recent times, largely because of the inherent advantages of disc recording (basically, very short access time and relatively large storage per unit), coupled with the relative inexpensiveness, and ease of using, modern flexible discs and disc files, for example of the type shown in U.S. Pat. No. 3,668,658.

In using such flexible discs, the concentric data tracks are exceedingly narrow and closely-spaced; thus, it is extremely important that the disc be accurately centered each time it is used, since radial errors even on the order of less than 5 mils are usually unacceptable and will preclude successful tracking to retrieve the recorded data. Furthermore, the recording discs are, as stated, flexible in nature (often being referred to as "floppy" discs) and somewhat fragile, being typically a mere sheet of plastic film such as Mylar on the order of about 3 to 4 mils thick, including the magnetic coating, and are thus easily stretchable, particularly at their centers, where the discs have a simple aperture for direct mounting upon a drive hub. In the past, mounting of the discs was accomplished mainly by use of a tapered hub which tended to center the disc as the latter was moved along a diverging tapered section into position against a flat, annular clamping surface. As a result of the requisite accuracy in centering the disc for proper recording or replay, however, the extreme accuracy required in properly machining such a tapered hub made the same basically impractical, as did the fact that the central hubs are subject to deformation and enlargement during the numerous times they are mounted and dismounted during their useful life. Also, the discs must, in order to be truly practical, be useful on different individual recorders, as well as on recorders made by different manufacturers, all of which are subject to dimensional variance even under the best of conditions.

SUMMARY OF THE INVENTION

The need has thus arisen for a hub which will automatically center (i.e., "sefl-center") a flexible recording disc for recording or replay, while at the same time holding the disc firmly in place for rotation and, furthermore, treating the disc gently and conserving its original configuration, particularly without deforming the central mounting aperture.

Accordingly, it is a major objective of the invention, as well as a foremost advantage thereof, to provide a self-centering hub for flexible magnetic discs which satisfies the foregoing requirements.

Other important objectives and advantages of the invention include the provision of a self-centering hub based on a new and different structural and operational concept and incorporating, for example, an annular arrangement of centering elements which are resiliently, elastically deformable against the annular edge of the mounting aperture in the disc, to automatically center the latter without subjecting it to distortion, wrinkling, or stretching.

Related objects and advantages include the provision, in such a structure, of centering elements which are rockably carried, which are each integral, resiliently-deformable elements, and which are lightly, freely-movably carried, preferably without mechanical fastener, and without being secured to parts of the recorder other than the driven hub, such as the movable clamp or the like which often retains the disc upon the hub for rotation.

A further important objective and advantage of the invention is the provision of such a self-centering structure which is carried on the driven hub element, and which does not significantly change the size or other physical characteristics of the latter, thereby requiring no particular increase in the size or required clearance of the hub or of the element which clamps the disc to the hub.

The foregoing objectives and advantages of the invention will become more apparent upon consideration of the preferred embodiment of the invention described in more detail hereinafter and shown in the attached drawings.

DESCRIPTION OF A PREFERRED EMBODIMENT

Figure 1:
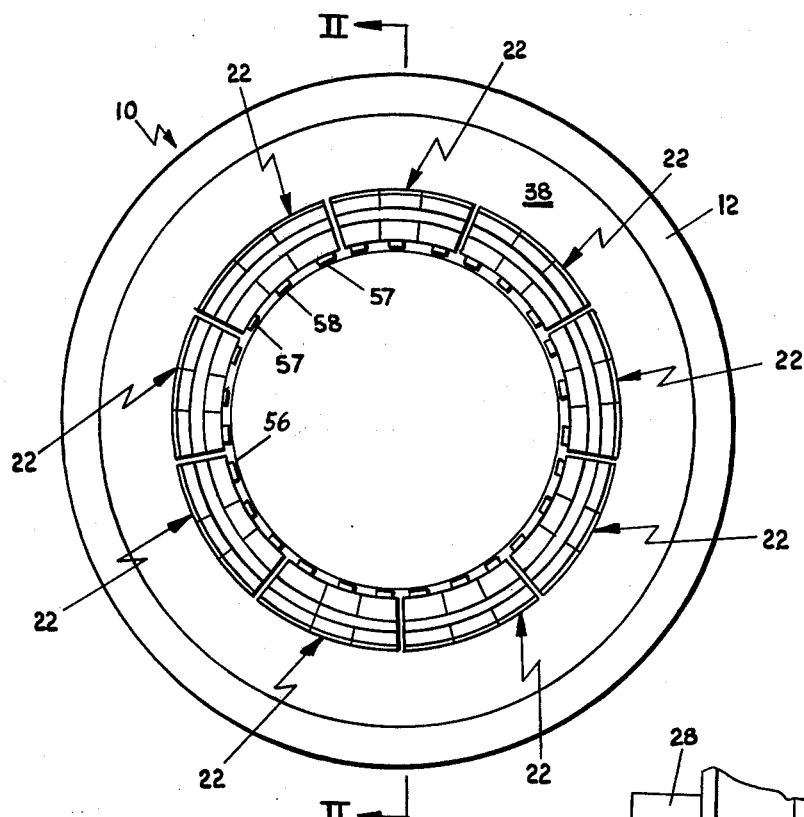
FIG. 1 is an enlarged front elevational view of a hub embodying the invention.
Figure 2:
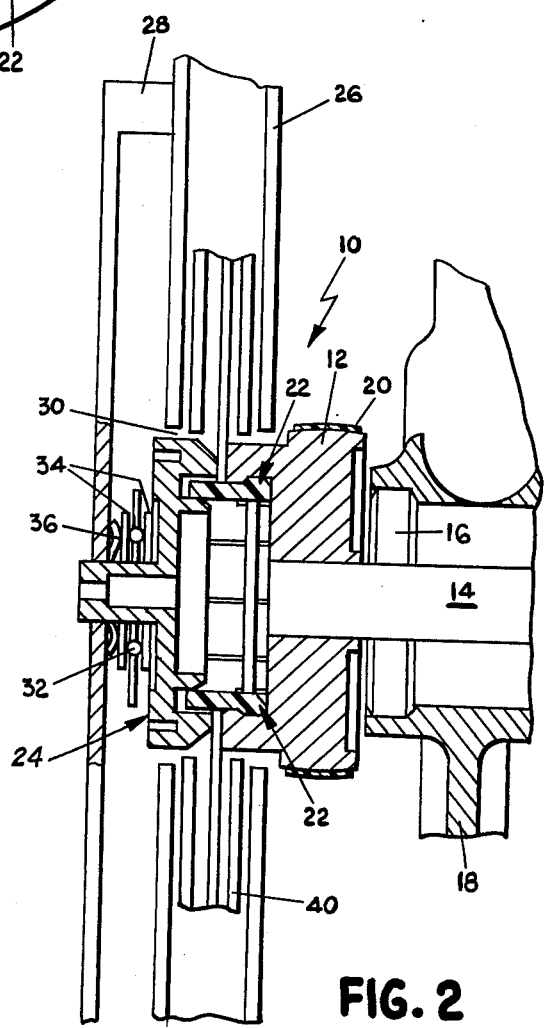
FIG. 2 is a central sectional view of the hub shown in FIG. 1, together with a disc and the clamping element which cooperates with the hub in mounting the disc thereto.
Figure 4:
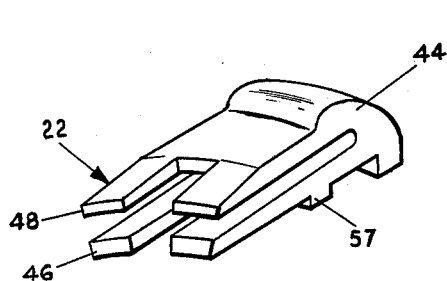
FIG. 4 is a front perspective view showing one segment of a first type of centering finger element according to the invention, such as shown in FIGS. 1-3.

The hub construction 10 of the invention, as seen generally in FIGs. 1 and 2, includes a driven circular drum 12 fixed upon a rotatable shaft 14 which is mounted in a bearing 16 carried by a rigid support 18, drum 12 being rotatably drivable as by a belt 20, or by the shaft 14 if desired.

The drum 12 carries a plurality of segmental centering finger elements 22 (FIGS. 1-4) disposed in a circular array in a concentric recess (FIGS. 2 & 3) formed in the drum, such that the finger elements project laterally beyond the surface of the latter. A disc-clamping member 24 is disposed laterally adjacent and coaxial with the circular drum 12, for example being mounted on the side of a disc-receiver 26 by a C-shaped bracket 28, which holds the clamp 24 in position relative to an enlarged aperture 30 in the side of disc receiver 26. The clamp 24 is rotatably mounted by bracket 28, as for example by using a caged bearing 32 held in place between a pair of flat washer-like elements 34 which form races for the bearing, with a resilient wave-washer 36 applying limited spring force against the back of the clamp, through the bearing and its races.

The disc-receiver 26 is preferably pivotally mounted so as to be movable toward and away from the drum 12, with the clamp 24 thus moving along a circular path, the plane of which is coincident with the axis of shaft 14 and, thus, the axis of circular drum 12. A more complete description of such an arrangement may be found in copending application Ser. No. 418,299, filed Nov. 23, 1973, now U.S. Patent No. 3,913,137, and assigned to the same assignee as that of the present invention.

The drum 12 has a generally flat, annular bearing surface 38 (FIGS. 1 and 3), against which the flexible disc 40 is clamped (FIG. 6) for driving rotation; that is, the clamp 24 has a flat annular shoulder 42 which contacts one side of the disc and clamps it in place against surface 38 of the drum 12, so that the drum, the disc, and the clamp 24 may all be rotated together on a common axis.

It is extremely important that disc 40 be centered very accurately on the drive axis of drum 12, and in accordance with this invention such centering automatically takes place as the clamp 24 is engaged with the disc and the drum 12. This is the purpose of the centering elements 22, shown in detail in FIGS. 3 and 4. As illustrated, the centering elements 22 each comprise an arcuately shaped segment which is somewhat keyhole-shaped in cross section having an enlarged head portion 44 at one end and a projecting tail portion which, in a preferred embodiment, is bifurcated in nature, having a pair of mutually spaced legs 46, 48, each of which constitute angularly coextensive segments of a circle being parts of a pair of generally concentric shoulderlike formations which protrude laterally from the open face of the drum 12 (FIG. 3).

It will be noted that the drum 12 has a circular central opening or recess formed therein, extending inwardly of the annular disc-engaging surface 38 mentioned hereinabove. Further, this recess is slightly hooded, having an annular, coaxial undercut 50 (FIG. 3) which defines a slight shoulder 52 oriented basically parallel to the outer face 38. As illustrated, the segmental centering elements 22 are disposed around the periphery of the recess in drum 12, with the enlarged head portion 44 of each element resting within the annular undercut or enlargement 50 of the recess in the hub. In this manner, the shoulder 52 helps to retain the centering elements in position, inasmuch as the enlarged head of the centering elements defines a rounded shoulder formation 54 which indexes behind the shoulder 52. Furthermore, however, a stiffly resilient ring 56 is disposed immediately radially inside of the array of centering elements 22, and bears diametrically outwardly against the latter as a function of its own resiliency, ring 56 being retained between an appropriate pair of protrusions 57 and 58 along the underside of the centering elements, defining a shallow slot in which the ring may seat. The outward resilient spring force of ring 56 tends to force all of the centering elements 22 diametrally outwardly, retaining them in place within the undercut portion 50 of drum 12.

Figure 3:
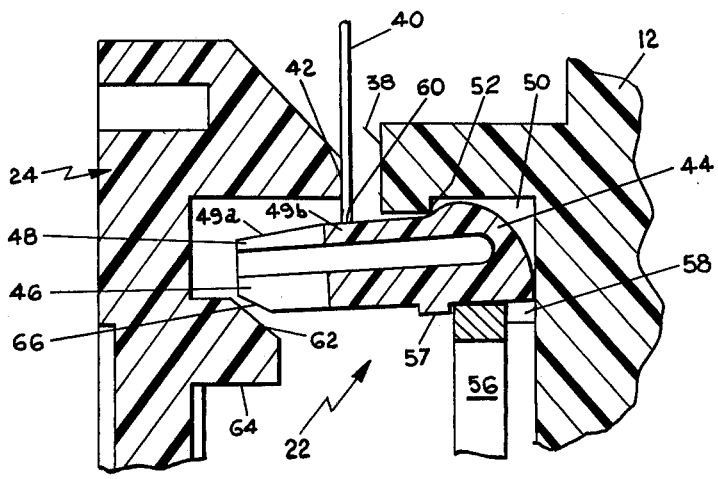
FIG. 3 is a further enlarged, fragmentary, sectional elevation showing the structure of FIG. 2 in partial engagement and moving a disc toward centered and clamped placement.

In this mounted position of the centering elements 22, the projecting arcuate legs 46 and 48 thereof extend outwardly beyond the annular bearing face 38, with the outer such leg or projection providing a segmented cylindrical hub formation, which operates initially to receive the flexible disc 40 by entering the central mounting aperture 60 therein (FIG. 3). This occurs when the disc receiver 26 is moved into operative position adjacent the drum 12 (as shown in FIG. 2) to thereby move the disc into engagement with the latter, passing the mounting aperture over the hub projection. After entering the central mounting aperture in the disc, however, the segmented cylindrical hub formation referred to above operates to automatically center the disc accurately upon the rotational axis of the drum 12. This occurs as the disc receiver 26 moves the last incremental distance which brings it to a fully-closed, "home" position, in which the clamping member 24 carried thereby has its outermost shoulder 42 (FIG. 6) tightly pressing the disc 40 against the face of bearing surface 38 on drum 12.

More particularly, the outermost annular leg formation 48 has a conically tapered leading edge 49a (FIG. 3), which forms a lead surface for the mounting aperture in the disc 40. Thus, as the disc receiver, which carries the disc in a position at least roughly approximating the desired ultimate one, moves toward the drum 12, the disc will always be positioned at least accurately enough so that conical lead surface 49a will enter the disc mounting aperture. As the disc receiver proceeds toward the home position, the disc is carried by the receiver, and is pushed by the shoulder 42 on disc clamp 24, along the tapering face 49a and onto the central portion 49b of the leg, which has a basically regular, constant-diameter semicylindrical surface. This provides a first "rough" centering function, during which it is to be noted that with the clamp 24 out of contact with the centering elements 22, the latter are cocked somewhat because of the outwardly-directed spring tension of ring 56. That is, with no force or restriction applied to the projecting ends of legs 46 and 48, the spring force from ring 56 is unbalanced with respect to the curving shoulder 54 along the outer edge of the enlarged head 44 on each of the various centering elements. This provides a rockable mounting for the latter, which are thus able to rock slightly into the position illustrated in FIG. 3, thereby cocking the projecting ends of legs 46 and 48 into a somewhat smaller, contracted diameter.

As the disc 40 is brought to the generally cylindrical portion 49b of leg 48, an angularly-beveled, conical surface 62 along the outer edge of the inner annular ridge projection 64 of clamping member 24 comes into contact with, and commences to bear outwardly against, a similarly-angled conical surface 66 along the inner diametral edge of leg 46. Accordingly, as the clamp 24 is increasingly moved toward the drum 12, not only does the flat outer shoulder 42 of the clamp push the disc 40 increasingly toward the bearing surface 38 on the drum, but additionally, the sloping inner surface 62 of the clamp acts to cam leg 46 diametrally outwardly, until such time as the sloping face 62 of the clamp passes beyond the sloping face 66 of the centering element leg (compare FIGS. 3 & 6), which event occurs at approximately the same time that shoulder 42 first pushes the disc 40 into contact with bearing face 38.

Accordingly, at each point around the annular periphery of the segmental centering element legs 46, the various centering elements are forced diametrally outwardly by the annular, conically-inclined surface 62 on the clamping member. This in effect enlarges the diameter of the cylindrical formation 49b formed by the various centering elements together, thereby effectively centering the disc 40. Furthermore, the centering elements are, as already stated, preferably bifurcated, having a space between the projecting legs 46 and 48; also, the centering elements are somewhat resilient in nature. Thus, the ultimate outside diameter to which the portions 49b of the different centering elements may be moved by the foregoing operation may advantageously be established to be slightly greater than the nominal inside diameter of the mounting aperture in the disc, since the natural resiliency of the centering elements may desirably be utilized to hold the disc in lightly resiliently-centered position.

That is, the two projecting legs of the centering elements will be resiliently sprung or flexed toward one another, the outer one 48 being held by the edge of the mounting aperture in the disc and inner one 46 pushed outward by the annular leg 64 of the clamping member. This action may actually result from elastic bowing of either (or both) legs 46 and 48, and may also include some bending at the nexus of the two legs. Preferably, the leg 48 is made to bow at least slightly, while leg 46 does not bow, a result enhanced by making leg 48 somewhat more readily flexible than leg 46, as for example by making the outer leg thinner, as illustrated in the drawing.

Figure 6:
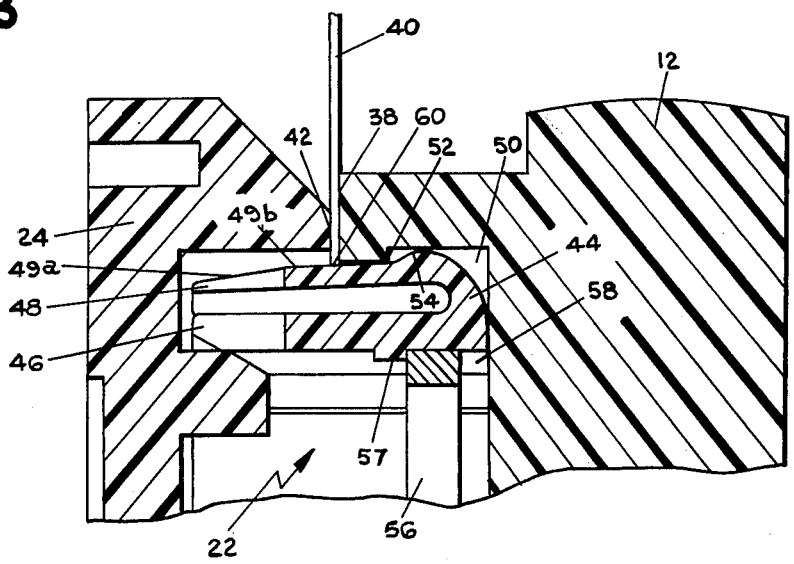
FIG. 6 is a fragmentary front perspective view similar to FIG. 3 but showing the structure in full engagement, with the disc fully centered and clamped into place.

Preferably, this outward spring force will be sufficient to very lightly stretch the mounting aperture of the disc, but only elastically, and then only very lightly. In fact, as shown in FIG. 6, the disc opening is preferably not stretched outward to the point where surface 49b of leg 48 contacts the hooded circumference of hub 12 between surface 38 and shoulder 52. This flexing, and the resultant stress placed on the disc around the edges of its mounting aperture, should only take place when the disc is very close to, or actually held against, bearing surface 38, by shoulder 42 of clamping member 24. Otherwise, if the disc is not closely supported at and around the mounting aperture at such time, it may well be buckled or otherwise permanently deformed.

Figure 5:
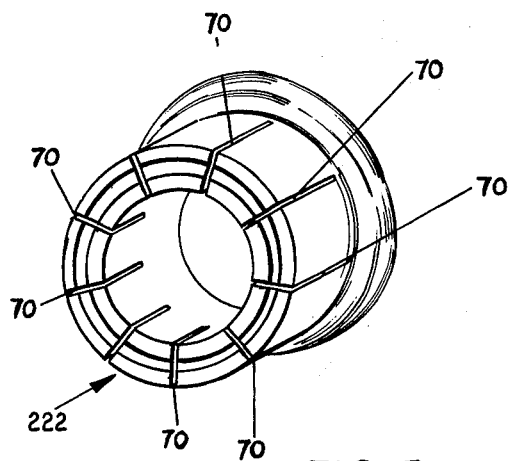
FIG. 5 is a front perspective view showing one segment of a second type of centering finger element according to the invention.

Accordingly, it may be seen that completely automatic self-centering operation occurs merely by bringing the disc receiver to a closed or home position, since during such movement (which may be of relatively small actual excursion) the centering elements will first be rockingly pushed outwardly, and ultimately flexed resiliently while the disc is being brought to its fully clamped position against the face of the drum. For this type of structure, it has been found that the centering elements may be made in the configuration shown form the synthetic polymer identified by the trade term "nylon", as may the ring 56 which holds them in place, with satisfactory resiliencies readily obtained. The clamping member 24 is preferably of a material such as the synthetic identified by the term "Lexan". The drum 12 may be of metal, for example, stainless steel. It is to be pointed out, however, that the novel self-centering operation may also be accomplished by use of centering elements such as are illustrated in FIG. 5, which are not comprised of independent, discrete segments, but which instead comprise a one-piece structure. Such a structure may, for example, be very similar to that shown in the other figures and described hereinabove, except integrally molded, with the mounting ring being either integral or separate. This type of structure is shown at 222 in FIG. 5, and may advantageously be slotted such as indicated at 70, if necessary, to help attain the desired resilience. On the other hand, one-piece structures of more lightly resilient polymers or the like are deemed entirely possible for use in accordance with the invention, with directly related operational characteristics to those set forth above. In this regard, words such as "segmental" in the specification are not intended to be strictly construed as independently different segments, but instead to mean merely annularly adjacent portions which contact different parts of the mounting aperture in the disc and in this sense act somewhat independently to bring about centering of the disc, by outward force against a different part of its mounting aperture.

It is entirely conceivable that upon examining the foregoing disclosure, those skilled in the art may device embodiments of the concept involved which differ somewhat from the embodiment shown and described herein, or may make various changes in structural details to the present embodiment. Consequently, al such changed embodiments or variations in structur which utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are described as follows:

1. A self-centering hub construction for mounting a disc in centered position thereupon, comprising in combination: a rotatable hub member and means for driving the same, said hub including a surface for receiving part of said disc in clamped relation thereagainst; a plurality of centering finger portions and means movably mounting said portions on said hub member, for movement at least toward and away from the axis of said hub member; a clamping means movable generally toward and away from said hub member and having a first surface for engaging said disc and clamping it against said surface of said hub member; and means for moving said centering finger portions outwardly and away relative to the axis of said hub member and the center of said disc, contacting at least a portion of an aperture in said disc and moving the latter relative to said axis and thereby centering it upon such axis.

2. The apparatus of claim 1, including means movably mounting said centering finger portions on said hub member comprising a resilient support freely holding said portions in place without mechanical fastening means connecting them to said hub member.

3. The apparatus of claim 1, wherein said finger portions are rockably carried upon said hub member.

4. The apparatus of claim 1, wherein said centering finger portions include first and second parts resiliently movable relative to one another.

5. The apparatus of claim 3, wherein said means for moving said centering finger portions comprises a pushing means for bearing against such portions and rocking at least certain thereof relative to said hub.

6. The apparatus of claim 5, wherein said centering finger portions include first and second parts resiliently movable relative to one another.

7. The apparatus of claim 6, wherein said pushing means bears against at least certain ones of said parts of said finger portions and rocks another such part thereof into contact with said disc.

8. The apparatus of claim 7, wherein said pushing means forces said other parts against said disc sufficiently to resiliently move such parts relative to those against which the pushing means bears.

9. The apparatus of claim 3, and including means for holding said centering finger portions in a first position of rocking movement relative to said hub in the absence of an oppositely-rocking force.

10. The apparatus of claim 9, wherein said holding means operates to return said finger portions to said first position upon removal of such oppositely-rocking force.

11. The apparatus of claim 10, wherein said finger portions are collectively disposed in a generally annular pattern and said first position thereof is diametrally smaller than a second position to which such portions are movable by said oppositely-rocking force.

12. The apparatus of claim 1, wherein said hub includes means defining a generally circularly shaped recess, and wherein said plurality of centering finger portions is supported on said hub at least partially by resting in said recess, said portions being disposed in an annular pattern.

13. The apparatus of claim 12, wherein said finger portions are pivotally rested within said recess, and are pivotally movable to enlarge or contact the diameter of said annular pattern.

14. The apparatus of claim 13, wherein said means for moving said centering finger portions comprises a conically tapered surface.

15. The apparatus of claim 14, including an expander member mounted for endwise movement relative to said hub member and carrying said tapered surface thereon for movement into engagement with said finger portions.

16. A self-centering hub construction for centering a disc, comprising in combination: a rotatable member; a plurality of disc-centering elements having an elongated curved rocking surface and carried on said rotatable member for rocking movement thereupon by rolling motion lengthwise along said rocking surface; said elements having disc-engaging extremities disposed in a generally circuitous formation about, and movable generally toward and away from, the rotational axis of said rotatable member during mutually opposite directions of said rocking movement; said circuitous formation having an effective diameter which is expanded and contracted by said rocking movements, said diametral expansion being sufficient to bring said extremities into contact with and move a disc located proximate to said rotatable member, to thereby center such disc on the axis of such member; and clamping means movable relative to said rotatable member and having a first surface for engaging and clamping a disc so centered against a surface rotatable with said rotatable member.

17. The apparatus of claim 16, including means interconnecting said disc-centering elements and at least partially holding the same in predetermined position relative to said rotatable member.

18. The apparatus of claim 16, including means holding said centering elements freely upon said rotatable member without mechanical interconnection between the latter.

19. The apparatus of claim 16, including means for biasing said centering elements toward one extremity of rocking movement.

20. The apparatus of claim 19, including means interconnecting said disc-centering elements and at least partially holding the same in predetermined position relative to said rotatable member.

21. The apparatus of claim 20, wherein said interconnecting means and said centering elements together form an open ring-like structure.

22. The apparatus of claim 21, wherein said rotatable member includes means defining an annularly-shaped recess and at least part of said open ring-like structure is positioned in said recess.

23. The apparatus of claim 22, wherein said part of said structure positioned in said recess includes at least part of said rocking surface.

24. The apparatus of claim 16, wherein said disc-engaging extremities of said centering elements comprise at least part of certain protruding leg portions, and wherein said leg portions together form a segmented projection which is insertable through a central aperture in said disc in mounting the latter.

25. The apparatus of claim 24, wherein said leg portions are moved by said rocking movement of said centering elements to effectively enlarge or contract the diameter of said segmented projection toward or away from engagement of said leg portions with the periphery of said disc aperture.

26. A self-centering hub construction for mounting a disc in centered position thereupon, comprising in combination: a rotatable member; a plurality of disc-centering portions carried on said member for at least limited movement relative thereto; said portions having disc-engaging extremities which are movable generally toward and away from the axis of said rotatable member during said relative movement; said portions also having actuation extremities spaced from said disc-engaging extremities thereof; actuator means for engaging said actuation extremities of said portions to move said disc-engaging portions thereof into contact with said disc; and said centering elements having resiliently-deformable portions between said actuation extremities and said disc-engaging extremities, for elastically deforming in response to said engaging operation of said actuator means and thereby resiliently biasing the disc-engaging extremities against said disc with the resiliency so produced, thus centering the disc upon said rotatable member and clamping means movable relative to said rotatable member and having a first surface for engaging and clamping a disc so centered against a surface rotatable with said rotatable member.

27. The apparatus of claim 26, wherein said disc-engaging extremities and said actuation extremities of said centering portions are generally disposed on opposite sides of such portions.

28. The apparatus of claim 27 wherein said disc-engaging extremities and said actuation extremities of said centering portions comprise outwardly-extending leg parts of the latter.

29. The apparatus of claim 26, wherein said resiliently-deformable portions comprise an integral structural part of said centering portions.

30. The apparatus of claim 29 wherein said disc-engaging extremities and said actuation extremities of said centering portions comprise protrusions extending outwardly from said centering portions; at least one of said protrusions being resiliently deformable and comprising at least part of said integral structural part of said centering portions.

31. A self-centering hub construction for mounting a disc and centering the same thereupon, comprising in combination: a rotatable hub member and means for driving the same, said hub being mounted in a fixed axial position and including a surface for receiving part of said disc in clamped relation thereagainst; a plurality of centering elements and means movably mounting the same on said hub member, for movement generally in a radial direction relative thereto; a rotatable clamping member mounted for movement into and out of generally coaxial clamping position against said hub member: said clamping member having means defining a clamping surface registrable with said hub member surface for clamping said disc thereagainst, and also having means defining a pusher surface for centering actuation; said centering elements having a pair of spaced sides collectively defining a pair of generally concentric annular formations, and also having resilient means deformable upon movement of one of such formations toward the other one thereof; one of said annular formations comprising a diametrally expandable hub for receiving a disc by its central aperture, and the other said formation comprising a means for engagement by said pusher surface of said clamping member.

* * * * *